United States Patent [19]

Hoover et al.

[11] 4,110,401
[45] Aug. 29, 1978

[54] SOLID-LIQUID SEPARATION OF LATERITE SLURRIES

[75] Inventors: Raul M. Hoover, Arvada; Guy W. Lussiez, Broomfield, both of Colo.; Hugh F. Reid, Pittsburgh, Calif.

[73] Assignee: Amax Inc., Greenwich, Conn.

[21] Appl. No.: 814,203

[22] Filed: Jul. 11, 1977

[51] Int. Cl.² .............................................. C01G 53/10
[52] U.S. Cl. .................................... 423/150; 75/119; 23/313 R; 264/114; 264/117
[58] Field of Search .......................... 209/5; 23/313 R; 210/49, 54 A; 264/114, 117; 423/150; 75/101 R, 115, 119

[56] References Cited

U.S. PATENT DOCUMENTS 3,804,613   4/1974   Zundel et al. ........................ 423/150

OTHER PUBLICATIONS

Yusa, M., et al., "Formation of Pellet-Like Flocs of Kaolinite by Polymer Chains," *Ceramic Bulletin* vol. 43, No. 5 (1964) pp. 402–406.

Shimoiizaka, J., et al., as abstracted in *Chemical Abstracts* vol. 75, 1971 #78,569k.

Primary Examiner—Brian Hearn
Attorney, Agent, or Firm—Michael A. Ciomek; Eugene J. Kalil

[57] ABSTRACT

A method is disclosed of separating a suspension of fine tailings particles from a material of value in a liquid medium which comprises, adding a small but effective amount of flocculant to said liquid medium while mixing said liquid medium and continuing said mixing to effect flocculation of said fine tailings particles, passing said liquid medium containing said flocculated particles to a rotating pelletizing drum and subjecting said medium to the rotational action of said drum to pelletize said flocculated tailings particles, thickening said pelletized tailings particles to provide an underflow of said pelletized tailings particles, and disposing said pelletized tailings particles.

10 Claims, 5 Drawing Figures

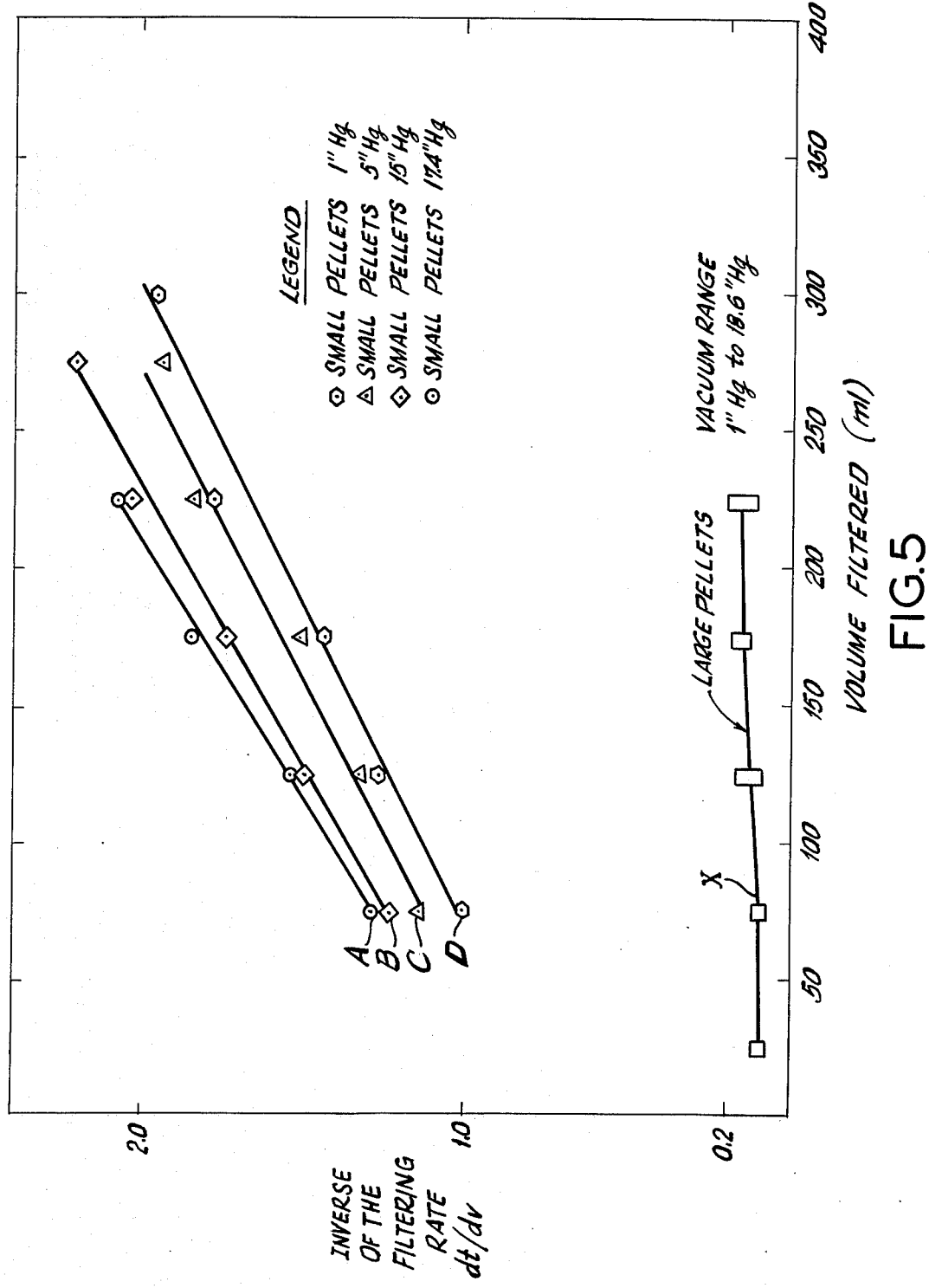

SOLID-LIQUID SEPARATION OF LATERITE SLURRIES

This invention relates to a method of improving the solid-liquid separation of slurries of fine tailings particles from a material of value and, in particular, to a method of separating fine tailings particles from a pregnant liquor containing dissolved valuable constituents.

STATE OF THE ART

Countercurrent decantation of slurries containing fine tailings particles generally requires numerous large size thickeners, especially where certain slurries exhibit poor settling and compaction characteristics. By compaction characteristics is meant the ability of fine tailings particles to sink and form an underflow of substantially higher pulp density for subsequent disposal thereof.

However, fine tailings particles generally exhibit poor settling characteristics and are difficult to dispose of. This problem has been particularly observed in the leaching of nickel-containing lateritic ores in which undissolved fine tailings particles are produced which must be separated efficiently and sufficiently rapidly from the pregnant liquor containing valuable metal ions.

For example, in recovering nickel and cobalt from lateritic ores, one method is to pulp the nickel ore (95% passing 325 mesh) to approximately 40% solids and then leach the nickel and cobalt selectively with sulfuric acid at elevated temperature and pressure (e.g. 250° C. and 525 psig) to solubilize about 90% to 95% each of the nickel and cobalt. The leached pulp is cooled and then washed by countercurrent decantation with the washed pulp going to tailings disposal.

The end solids remaining after the high pressure leach comprise very fine particles of generally less than 400 mesh size (U.S. Standard Screen) and require the use of numerous large size thickeners because of the inherently poor settling and compaction characteristics of the leached solids. This operation generally requires very high capital investment costs. Moreover, the system is unstable and difficult to control due to fluctuations in the laterite ore properties. In addition, the solids tailing pulp produced by the aforementioned method is difficult to dispose of and constitutes an environmental problem.

It is known to flocculate dispersed fines to increase the settling rate thereof; however, the flocs formed to not always filter easily.

The conversion of flocs to pellets of larger size is disclosed in a paper entitled "Formation of Pellet-Like Flocs of Kaolinite by Polymer Chains" which appeared in the *Ceramic Bulletin,* Vol. 43, No. 5 (1964). The flocs of kaolinite are pelletized in order to enhance further the settling rate of a material of value being recovered.

The present invention differs in that it is directed to a method for easily separating tailings from a material of value so that the tailings can be disposed of easily without creating an environmental problem.

OBJECTS OF THE INVENTION

It is thus an object of the invention to provide a method for improving solid-liquid separation.

Another object is to provide a method for improving the solid-liquid separation of leached pulp in the hydrometallurgy of nickel-containing lateritic ores.

These and other objects will more clearly appear from the following disclosure and the accompanying drawings, wherein:

FIG. 5 compares filtering rate of small pellets with large pellets.

STATEMENT OF THE INVENTION

One embodiment of the invention resides in a method of separating a slurry or suspension of fine tailings particles from a liquid medium, the method comprising, adding a small but effective amount of a flocculant to said liquid medium while mixing said liquid medium and continuing said mixing to effect flocculation of said fine tailings particles, passing said medium containing said flocculated particles to an inclined rotating pelletizing drum and subjecting said medium to the rotational action of said drum to pelletize said flocculated particles, thickening said pelletized tailings particles to provide an overflow of said liquid medium and an underflow of said pelletized tailings, and then disposing said pelletized tailings.

The invention is particularly applicable to the separation of leached laterite residues from pregnant leach liquor. The preferred flocculants are non-ionic or weakly anionic polyacrylamides. Polyacrylamides found suitable for the purpose include those sold under the trademarks SEPARAN MG-200, SUPERFLOC 16, SUPERFLOC 20, and the like.

DETAILS OF THE INVENTION

Bench scale tests have demonstrated that pelletizing of acid leached laterite particles, i.e. tailings and subsequent washing on a filter belt provide a feasible alternative to the conventional countercurrent decantation techniques.

The particles of the slurry were flocculated by adding about 1 lb/ton (0.45 kg/ton) of polyacrylamide resin known by the trademark SEPARAN MG-200 and the flocculated slurry then pelletized in a laboratory balling drum. The drum speed was varied to provide relatively coarse pellets at 20 rpm (peripheral speed of about 0.85 ft/sec) and fine pellets at 60 rpm (peripheral speed at 2.55 ft/sec).

Filtering and countercurrent washing tests were conducted on a leaf filter (polypropylene cloth) of about 0.1 SF (square foot). In the filtering tests, about 72 grams of solids and about 350 ml of solution were fed on the filter, the rate of filtrate production being recorded at various levels of vacuum. The amount of moisture remaining in the filter cake was obtained by oven drying.

The supernatant leach liquor was removed by free drainage and the pelletized particles were repulped and filtered three times. The filtering was conducted at a nominal vacuum corresponding to 1 inch of mercury column. The wash ratio was in the range of 1.8 to 2.1. A total of six batches in each size range was processed through countercurrent washing to ensure that a steady state had been achieved, the wash solutions being later analyzed for nickel and the filter cake dried to determine residual moisture content.

Figure 4:
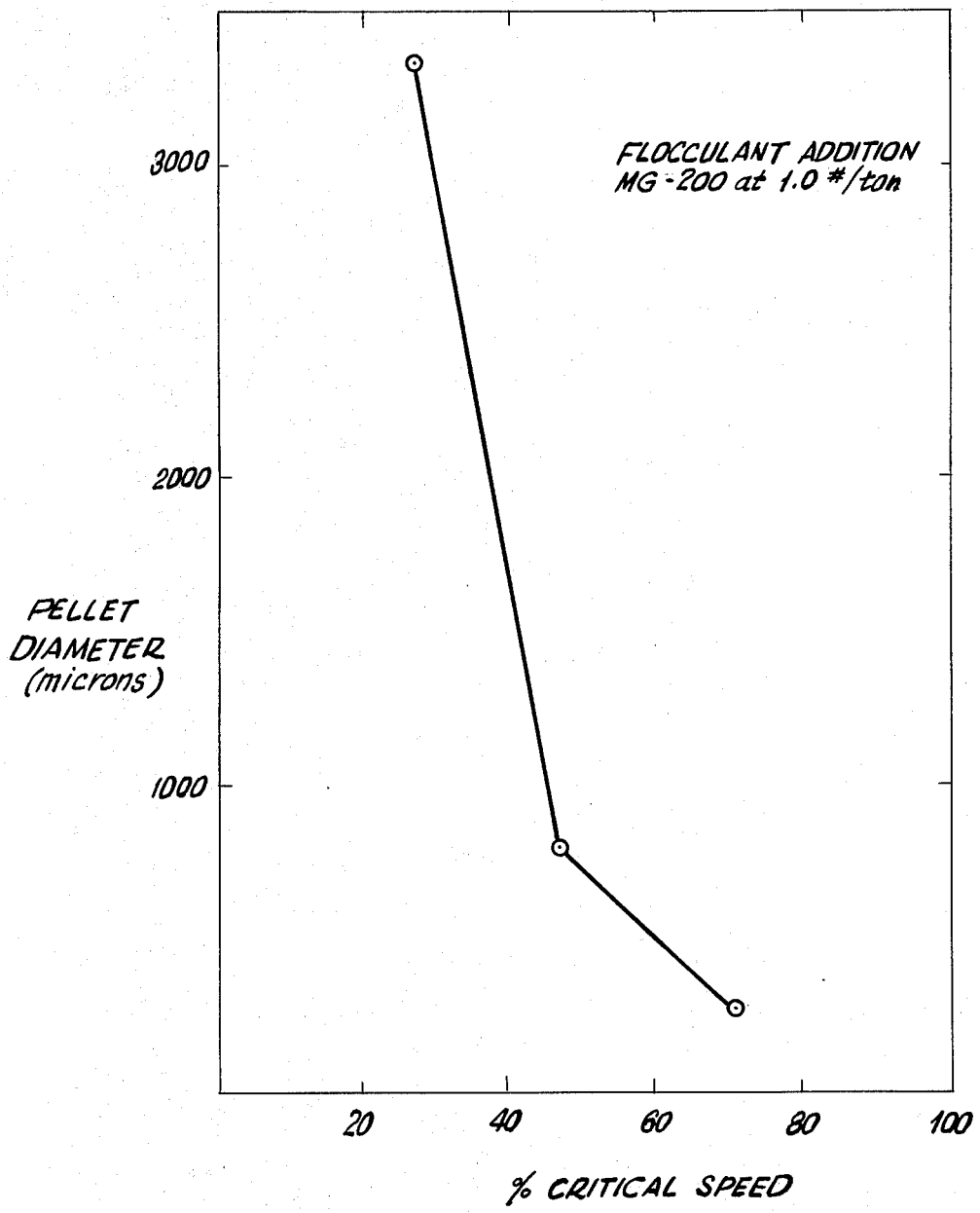
FIG. 4 is a curve that depicts the relationship between pellet diameter formation and critical speed of the pelletizing drum.

At a constant rate of feed and flocculant addition, it was observed that the size of spherical agglomerate was related to the speed of rotation of the pelletizing drum. The relationship between the average pellet size and percent critical speed of rotation of the drum is shown in FIG. 4. With increasing drum speed, the pellet size asymptotically approaches a value corresponding to unpelletized flocculated particles. The larger particles exhibit a mottled, flakey appearance which suggests that they were produced at least partially at the expense of smaller pellets, perhaps by a combination of "snowballing" and coalescing of smaller spheres.

Filtering results (note FIG. 5) indicate that the larger pellets filter at a faster rate. In the use of the large pellets produced at 30 rpm, the filtering is essentially constant over the last 150 ml of filtrate produced and seem to be independent of the vacuum applied as will clearly appear by comparing curve X (larger pellets) with curves A, B, C and D (small pellets). The smaller pellets produced at 60 rpm filtered at a much slower rate. The filtering capacity of the large pellets was 18.7 MT/SF/Day (metric ton per square foot per day); whereas, the filtering capacity of the small pellets was 0.25 MT/SF/Day.

Several flow sheets may be employed in carrying out the invention. Thus, referring to FIG. 1, a laterite slurry 10, following leaching, and having a pulp density of about 32% solids, is fed to a slurry flocculant mixer 11 to which about 1 lb/ton of flocculant is added on the dry basis in the form of a polyacrylamide resin, wherein the finely divided tailings particles are converted to flocs. The flocculated material is fed into pelletizing device or drum 12 and the drum rotated at about 30% of critical speed to convert the flocs to easily separatable pellets, the pelletized mix, including the pregnant liquor, is fed to pre-thickener 13, the pellets settling easily to provide an underflow 14 of 50% solids and an overflow of pregnant liquor 15 going to nickel recovery. Part of the overflow is recycled to incoming laterite slurry 10 via line 16 and to slurry flocculant mixer via line 17.

The underflow of solids is passed to filter 18 and wash water 19 circulated therethrough to provide 3 or 4 stages of countercurrent washing, with a portion of the wash liquor 18A from the filter being recycled to the pre-thickener. The pellets or solids tailings 20 are disposed of as shown.

Figure 2:
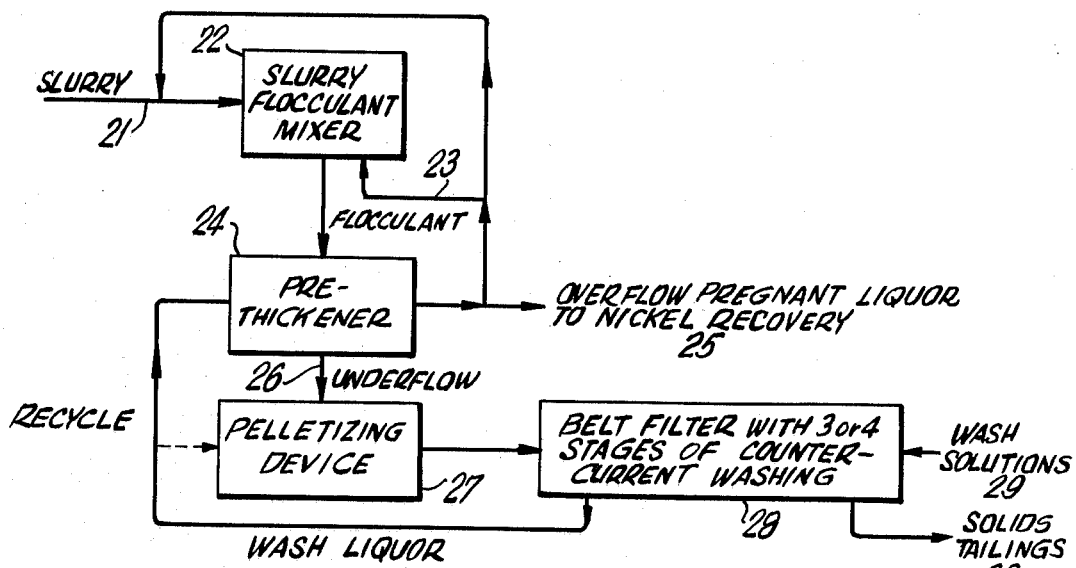
FIG. 2 illustrates another embodiment for carrying out the method of the invention.

In FIG. 2, a nickel laterite slurry 21 of about 18% solids density is fed to slurry flocculant mixer 22 and about 0.7 lb. of flocculant 23 added per ton of feed on a dry basis. Following the formation of flocs, the flocculated material is passed to pre-thickener 24 to provide an overflow 25 of pregnant liquor to nickel recovery, a part of the pregnant liquor overflow being recycled to incoming slurry 21. The thickened underflow of about 45% of flocs 26 is fed to pelletizing device or drum 27 and the flocs pelletizing by rotation of the drum at about 30% of critical speed of said drum, the pelletized tailings being then fed to belt filter 28 and washed with wash solutions 29 using 3 to 4 stages of countercurrent washing to provide solids tailings 30 of easily disposable pellets. The wash water from the belt filter is recycled to the pre-thickener and/or pelletizing device 27.

By flocculating and pelletizing the tailings solids or particles, the separation of the valuable nickel-containing pregnant liquor from the tailings is easily and efficiently effected.

Figure 1:
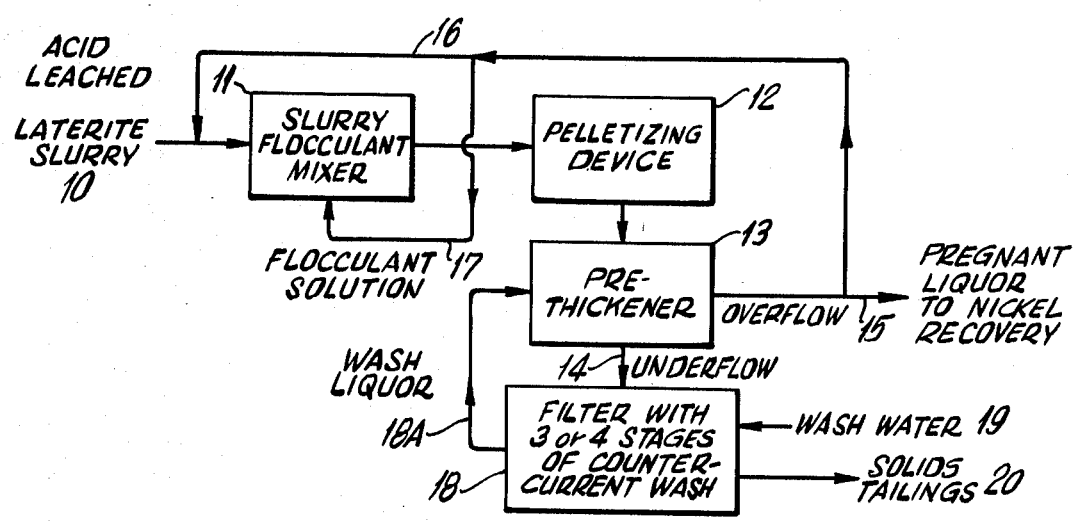
FIG. 1 is one embodiment of a flow sheet for carrying out the method of the invention.
Figure 3:
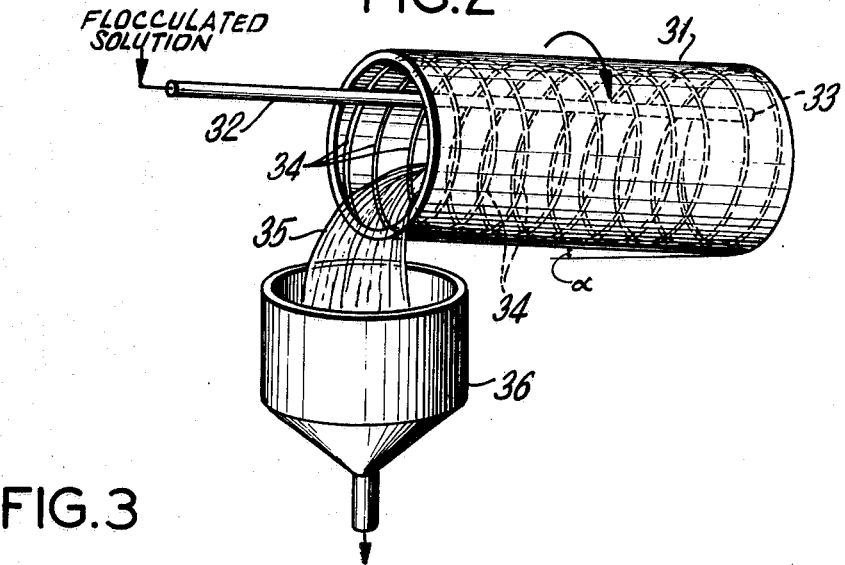
FIG. 3 is a schematic rendition of a rotatable pelletizing drum discharging into a thickener.

A schematic of a pelletizing drum 31 is shown in FIG. 3 showing a feed pipe 32 for feeding flocculated solution entering the opening of the drum and extending towards the closed end thereof at 33, the drum having a continuous helix 34 of a rod integral with the inside wall thereof to provide ribs running substantially the whole length of the drum to control the flow of the material from the rear of the drum to the opening thereof, the pelletized material 35 flowing into a receiving vessel 36 prior to further treatment as shown in the flow sheet of FIG. 1.

The pelletizing drum is preferably maintained at a small acute angle $\alpha$ above the horizontal as shown in FIG. 4, the rotational speed of the drum being maintained from over about 20% to about 35% or to about 40% of critical speed of rotation (FIG. 4). A rotational speed of approximately 30% of critical speed is preferred.

The importance of obtaining large pellets for efficiently separating the pregnant liquor from the tailings is shown in FIG. 5 which depicts a set of curves A. B. C. and D showing poor filterability of small pellets at partial vacuums corresponding to 1 inch, 5 inches, 15 inches and 17.4 inches of mercury (Hg). However, with larger pellets (curve X), very easy filtering occurred over the range of partial vacuums of 1 inch Hg to 18.6 inches Hg.

The test results show that, at a constant rate of feed and flocculant addition, the size of the spherical agglomerate or pellet depends on the speed of the pelletizing drum (note FIG. 4). The slower the speed, the larger the pellets.

The amount of flocculant added may range from about 0.5 to 5 lbs. per ton of feed taken on the dry basis, preferably from about 0.5 to 2 lbs/ton and, more preferably, from about 0.5 to 1 lb/ton.

As stated hereinbefore, the invention is particularly applicable to the leaching of nickel lateritic ore. A typical lateritic ore composition ranges by weight from about 0.5% to 2.5% Ni, 0.005% to 1% Co, 0.2% to 10% Al, 0.3% to 15% Cr, up to 15% Mg, 0.25% to 5% Mn, 2% to 45% $SiO_2$ and the balance substantially 10% to 55% Fe, the foregoing metal values being present as oxides. The ore is prepared for leaching by separating it to a minus 100 mesh fraction to optimize the nickel content (U.S. Standard Screen) and the ore preferably ground to pass 270 mesh screen.

The ore is leached in an autoclave at a temperature of about 150° C. to 300° C. at a pressure of about 225 psig to 1750 psig at an acid to ore ratio (sulfuric acid) of about 0.1 to 1 to as high as about 0.5 to 1 taken on the dry weight of ore depending upon the amount of magnesium in the ore. For example, the higher the amount of magnesium in the ore, the greater is the acid requirement. The pulp density of the slurry may range from about 20% to 50% solids. The pH of the pregnant liquor is usually less than 1 and generally less than about 0.7.

Following leaching, the leached solids or tailings remaining are finely divided and usually have a size less than about 400 mesh. It is these solids which settle with difficulty and to which the invention is directed.

Thus, in its broad aspects, the ore is first leached at a pulp density of about 32% solids. The leached slurry is then treated in accordance with either of the flow sheets of FIG. 1 or 2 or variations thereof to provide a separated pregnant liquor which is sent to nickel and cobalt recovery and pelletized tailings which are easily disposed of.

As stated hereinbefore, the preferred flocculant is a non-ionic or weakly anionic polyacrylamide of the following formulation:

with x denoting the number of mer units making up the polymer, a high molecular weight polymer being particularly preferred.

An example of a high molecular weight polymer flocculant is given as follows:

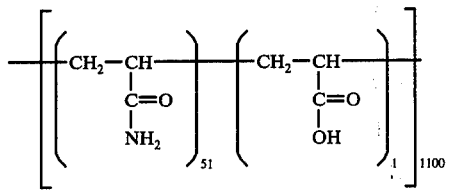

As will be appreciated, N-substituted derivatives of the acrylamide polymer can be used.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and the appended claims.

What is claimed is:

1. A method of leaching a finely divided nickel lateritic ore which comprises,
    forming a slurry of said ore in an acid solution containing sulfuric acid in an amount ranging from about 0.1 to 0.5 pound of acid per pound of ore taken on the dry basis, said ore being less than about 270 mesh in size,
    leaching said ore at a temperature of about 150° C. to 300° C. and a pressure of about 225 psig to 1750 psig to effect substantially complete solution of the nickel in said ore and form a pregnant liquor thereof and leave a slurry of fine tailings particles,
    releasing the pressure on said leached slurry and passing said slurry to a flocculant mixer,
    adding a small but effective amount of a flocculant to said slurry while mixing said slurry and continuing said mixing to effect flocculation of said tailings,
    passing said flocculated slurry to a pre-thickener and thereby produce an overflow of said pregnant liquor and a thickened underflow of flocculated tailings, a portion of said pregnant liquor being removed and sent to nickel recovery with the remainder portion being recycled to the flocculant mixer,
    passing said thickened flocculated slurry to a rotating pelletizing drum and subjecting said slurry to the rotational action of said drum to pelletize said tailings at a rotational speed ranging from over 20% to about 40% of the critical speed of said drum,
    filtering said pelletized tailings and subjecting said filtered pellets to countercurrent washing to provide washed tailings and provide recycle wash liquor,
    recycling said wash liquor to said pre-thickener,
    and disposing of said washed pelletized tailings.

2. The method of claim 1, wherein said pelletizing drum is disposed at a small acute angle to the horizontal.

3. The method of claim 1, wherein the flocculant is a polyacrylamide.

4. The method of claim 3, wherein the amount of polyacrylamide added to said slurry ranges from about 0.5 to 5 lb. per ton of ore on a dry basis.

5. The method of claim 4, wherein the amount of polyacrylamide added to said slurry ranges from about 0.5 to 2 lbs. per ton of ore treated.

6. A method of leaching a finely divided nickel lateritic ore which comprises:
    forming a slurry of said ore in an acid solution containing sulfuric acid in an amount ranging from about 0.1 to 0.5 pound of acid per pound of ore taken on the dry basis, said ore being less than about 270 mesh in size,
    leaching said ore at a temperature of about 150° C. to 300° C. and a pressure of about 225 psig to 1750 psig to effect substantially complete solution of the nickel in said ore and leave a slurry of fine tailings particles,
    releasing the pressure on said leached slurry and passing said slurry to a flocculant mixer,
    adding a small but effective amount of a flocculant to said slurry while mixing said slurry and continuing said mixing to effect flocculation of said tailings,
    passing said flocculated slurry to a rotating pelletizing drum and subjecting said slurry to the rotational action of said drum to pelletize said tailings at a rotational speed ranging from over 20% to about 40% of the critical speed of said drum,
    passing said pelletized tailings to a pre-thickener and thereby form an overflow of pregnant liquor and an underflow of pelletized tailings, a portion of said pregnant liquor being removed and sent to nickel recovery with the remainder portion being recycled to the flocculant mixer,
    filtering said pelletized tailings and subjecting said filtered pellets to countercurrent washing to provide washed tailings and provide a recycle wash liquor,
    recycling said wash liquor to said pre-thickener,
    and disposing of said washed pelletized tailings.

7. The method of claim 6, wherein said pelletizing drum is disposed at a small acute angle to the horizontal.

8. The method of claim 6, wherein the flocculant is a polyacrylamide.

9. The method of claim 8, wherein the amount of polyacrylamide added to said slurry ranges from about 0.5 to 5 lb. per ton of ore on a dry basis.

10. The method of claim 9, wherein the amount of polyacrylamide added to said slurry ranges from about 0.5 to 2 lbs. per ton of ore treated.

* * * * *